Nov. 25, 1952          D. P. RUDISILL          2,619,185
SAFETY FUEL CUTOFF FOR VEHICLES
Filed July 27, 1950          3 Sheets—Sheet 1
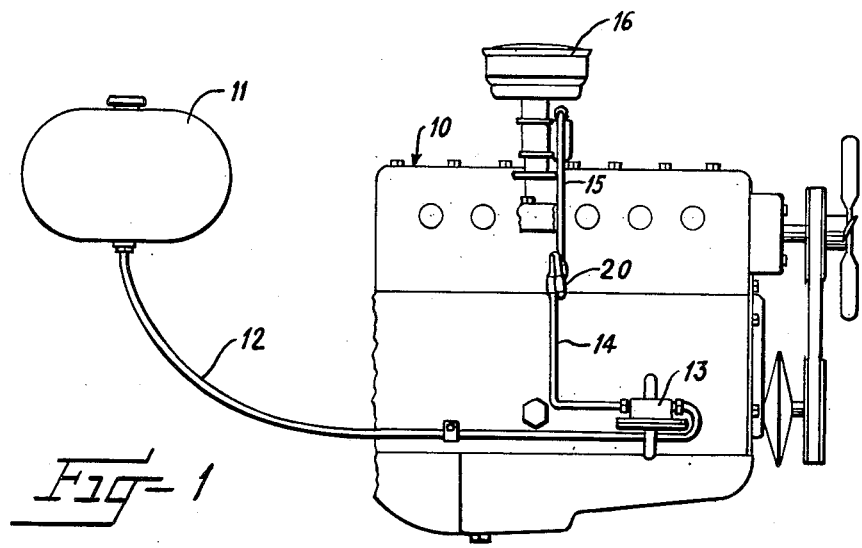
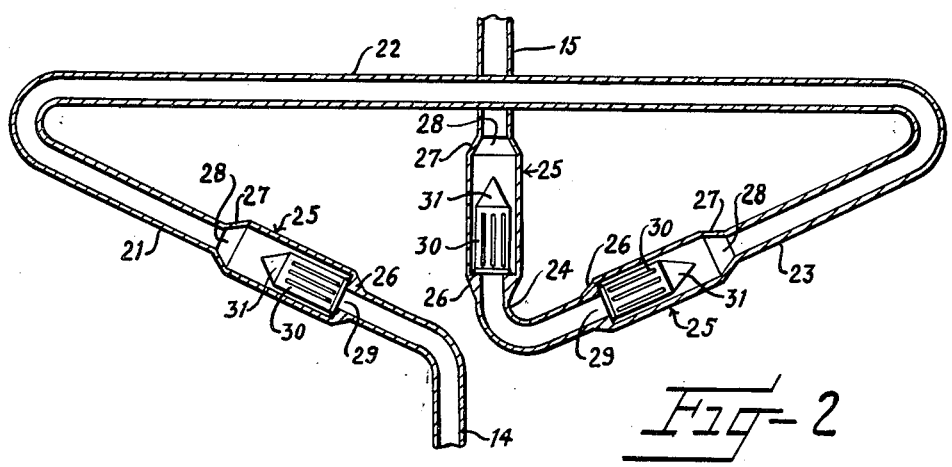
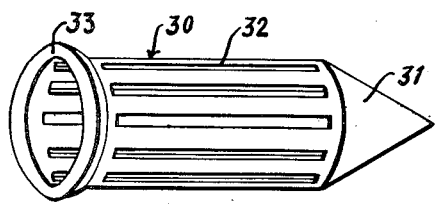
DORUS P. RUDISILL,
INVENTOR.
BY Eaton + Bell
ATTORNEYS Nov. 25, 1952  D. P. RUDISILL  2,619,185
SAFETY FUEL CUTOFF FOR VEHICLES
Filed July 27, 1950  3 Sheets-Sheet 2
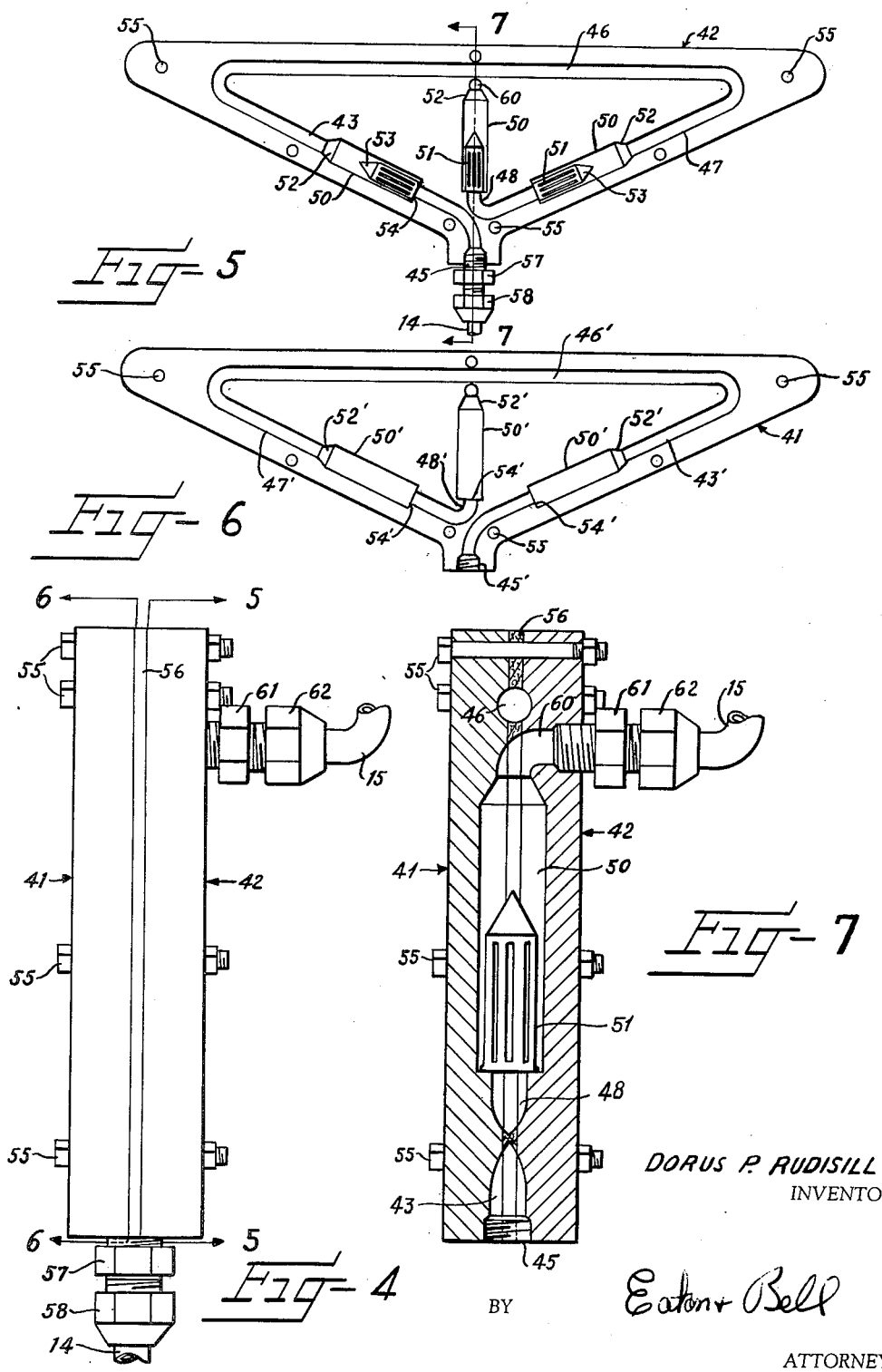
DORUS P. RUDISILL,
INVENTOR.
BY Eaton + Bell
ATTORNEYS Nov. 25, 1952  D. P. RUDISILL  2,619,185
SAFETY FUEL CUTOFF FOR VEHICLES
Filed July 27, 1950  3 Sheets-Sheet 3
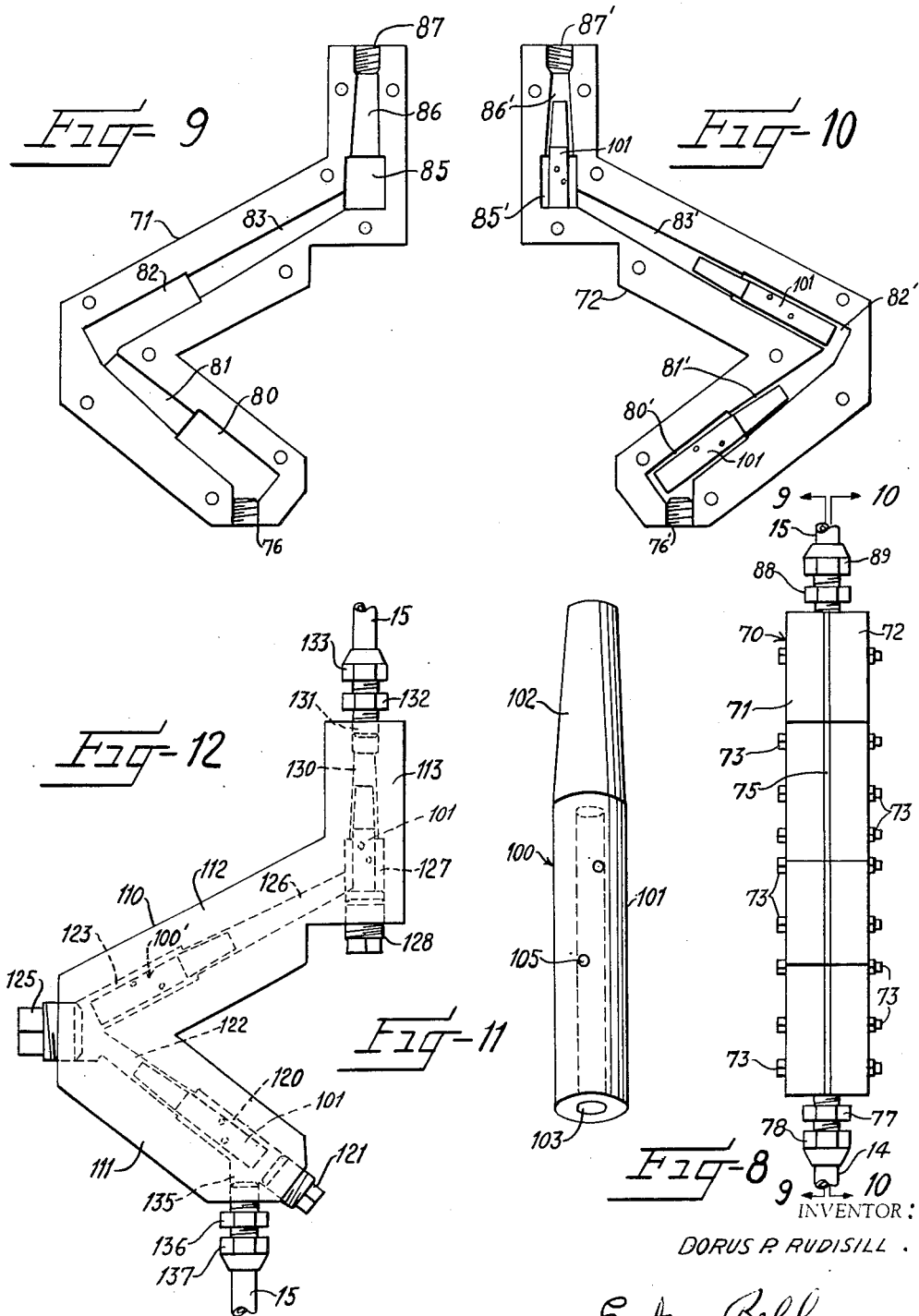
INVENTOR:
DORUS P. RUDISILL.
BY Eaton + Bell
ATTORNEYS Patented Nov. 25, 1952

2,619,185

UNITED STATES PATENT OFFICE 2,619,185

SAFETY FUEL CUTOFF FOR VEHICLES

Dorus P. Rudisill, Hickory, N. C.

Application July 27, 1950, Serial No. 176,094

15 Claims. (Cl. 180—82)

This invention relates to the improved safety device for motor vehicles and the like and more especially to a device incorporated in the fuel line of said vehicle for cutting off the flow of fuel therethrough when the vehicle in which the engine is mounted is upset or overturned.

It is an object of this invention to provide a safety device adapted to be used with gasoline engines mounted in vehicles such as automobiles, trucks and the like and said safety device comprising means disposed in the fuel line of said vehicle to cut off the flow of fuel to the engine in case the vehicle overturns to thus prevent fuel from being pumped into the engine and to help minimize the possibility of fire.

It is another object of this invention to provide a device of the type described wherein the fuel line will be provided with at least one enlarged portion therein having a weight member slidably disposed within the enlarged portion and being so constructed that under normal operating conditions fluid will flow through the enlarged portion around or through said weight member and the weight member being movable so that if the vehicle is overturned or moved to an abnormal position, the weight member will be caused to jam in the orifice between said enlarged portion and the fuel line to shut off the flow of fuel therethrough.

It is another object of this invention to provide a device of the type described wherein a fuel line has a plurality of off-set or angularly disposed portions therein and each of said off-set portions is provided with an enlarged chamber communicating at each end with said fuel line having a restricted orifice therein communicating with the fuel line, and each of said chambers having a hollow weight member slidably mounted therein, and normally disposed away from the orifice in said chamber, whereby fuel may normally flow through said chamber and about said weight member and out through said orifice, and said weight member being movable by gravity upon the vehicle being upset or overturned and the disposition of the angularly disposed off-set portions being changed, whereby the weight member will slide in said chamber to close said orifice and to cut off the flow of fuel therethrough.

Some of the objects of the invention having been stated, other objects will appear as the description proceeds when taken in connection with the accompanying drawings in which—

Figure 1 is a schematic elevation illustrating the manner in which the safety device may be connected in the fuel line of a vehicle;

Figure 2 is a vertical-sectional view taken through the safety device and showing the off-set portions of the fuel line and the chambers therein;

Figure 3 is an isometric view of one form of weight member removed from the safety device;

Figure 4 is a side elevation of a modified form of safety device formed of two members joined together;

Figure 5 is a vertical-sectional view taken substantially along the line 5—5 in Figure 4 and showing one of said members, omitting the gasket, and showing the weight members therein;

Figure 6 is a vertical-sectional view taken substantially along the line 6—6 in Figure 4 and showing the other of said members but omitting the gasket;

Figure 7 is a vertical-sectional view through the safety device shown in Figure 4 and taken substantially along the line 7—7 in Figure 5 but showing both members in assembled position;

Figure 8 is a side elevation of still another modified form of the safety device formed from a pair of members joined together;

Figure 9 is a vertical-sectional view taken along the line 9—9 in Figure 8 and showing one of said members but omitting the gasket;

Figure 10 is a vertical-sectional view taken along the line 10—10 in Figure 8 and showing the other of said members with weight members disposed therein but omitting the gasket;

Figure 11 is an isometric view of one of the modified weight members removed from the safety device;

Figure 12 is a side elevation of still another modified form of the invention formed from a single piece of material, the fuel line, chambers and weight members being shown in dotted lines.

Referring more specifically to the drawings, the numeral 10 broadly designates a gasoline engine with which this device is adapted to be used, the engine 10 being suitably mounted in a vehicle such as an automobile or truck, and the schematic illustration in Figure 1 being for purposes of illustration only, it being understood that the subject of this invention may be used with any type of fluid burning or combustion engine and may be disposed in any suitable position in the fuel line. A fuel tank 11 is shown provided with a fuel line 12 extending therefrom to suitable fuel pump 13 and a fuel line 14 extends from the pump 13 to one side of a safety device 20 and a fuel line 15 extends from the other side of the safety device 20 to a suitable carburetor 16 connected to the engine 10 so that fuel may flow from the tank 11 through the pipe 12, the pump 13, the pipe 14, the safety device 20, the fuel line 15 and the carburetor 16 into the cylinder of the engine 10 to be utilized for operation of the engine in a conventional manner.

The improved safety device is broadly designated at 20 and may be disposed in any suitable position in communication with the fuel line 12, 14 or 15 and is preferably disposed in a vertical position between the lines 14 and 15 between the fuel pump 13 and the carburetor 16.

The safety device 20 may be formed in any suitable manner as by providing the fuel line 14, 15 with one or more off-set or angularly disposed portions, three of such portions being shown in Figure 2 for purposes of illustration. Referring to Figure 2, it will be observed that the fuel line 14 communicates with a line secured thereto and extending at an angle to form an off-set portion 21 which communicates at its other end with a line forming an off-set portion 22, preferably disposed perpendicular to the line 14, and communicating with a line forming a third off-set portion 23 extending at an angle to the line 14 and communicating with a line forming a vertically extending portion 24 connected to and communicating with the line 15.

Each of the portions 21, 23 and 24 is provided with an enlarged chamber 25, each of the chambers 25 being identical and bearing the same reference characters. Each chamber 25 is formed in any suitable manner as by a pipe of slightly larger diameter than the fuel lines forming the off-set portions 21, 22, 23 and 24 and each end of the chambers 25 communicates with the respective lines forming the off-set portions 21, 23, and 24 and one end of the chamber 25 has a base portion 26 at one end thereof at its junction with the respective lines 21, 23 and 24 and the other end of the chamber 25 is provided with a restricted substantially conical portion 27 merging with the respective fuel lines 21, 23 or 24 to form an outlet orifice 28, there also being an inlet orifice 29 adjacent the base portion 26 to permit fuel to flow through the line 14, the orifice 29, the chamber 25, and the orifice 28 in each of the off-set portions 21, 23 and 24 and through the line 15.

A weight or weight member 30 is mounted for sliding movement in each of the chambers 25 and is provided with a beveled or pointed tip portion 31 adapted to seat in the restricted portion 27 to close the orifice 28 when the weight member 30 is moved into position within the restricted portion 27 of the chamber 25. The weight member 30 may be of any desired construction and is preferably cylindrical in shape and is hollow and is provided with a plurality of openings 32 so that fuel flowing through the chambers 25 may flow through the hollow weight member 30 and out through the openings 32 to thus pass around the weight member 30 when it is disposed in the position shown in Figure 2. The weight member is also preferably provided with a base portion 33 which is normally adapted to rest on the base portion 26 at the inlet side of the chamber 25 leaving the orifice 28 unrestricted.

In normal operation of the vehicle with fuel flowing through the safety device 20, the weight members 30 will be disposed within the chambers 25 substantially as shown in Figure 2 with the bases 33 thereof resting on the bases 26 of the respective chambers 25. Now if the vehicle in which the engine 10 is contained should turn over to one side or the other or over on its nose one or more of the weight members will be caused to slide, by gravity, from the position shown in Figure 2 to a point where the pointed tip portion 31 thereof will jam in the outlet orifice 28 and seal the orifice 28 against the flow of fuel therethrough. This would cut off the flow of fuel to the carburetor 16 which will cause the engine to cease operation thus minimizing damage to the engine and minimizing the danger of fire caused by fuel overflowing. Upon the vehicle being restored to normal position, the weight member or members 30 will automatically slide, by gravity, back to the position shown in Figure 2 so that fuel may again flow therethrough and therearound and through chambers 25 and the outlet orifice 28 to the line 15 and carburetor 16.

It has been noted that the lines 14 and 15 are preferably vertically disposed and that the portions 21 and 23 extend in angular relation thereto. It has been found that for best operation the portions 21 and 23 should extend at an angle of approximately 25 to 30 degrees from the horizontal. The portions 21 and 23 should extend at an angle sufficient to prevent accidental movement of the weight members 30 but small enough to insure positive operation upon the vehicle being upset or overturned. The vertical portion 24 is provided to insure positive operation of the device in the event the vehicle is turned over 180 degrees. It is obvious that only one chamber 25 may be utilized with effective results but a plurality of chambers 25 are preferably provided for maximum effectiveness under all conditions. If desired, the off-set portions may zig-zag rather than extend as illustrated.

Second form

Referring to Figures 4, 5, 6 and 7, there will be observed a modified form of a safety device broadly designated at 40 and adapted to be used in a manner identical to that of the device 20 heretofore described and connected in the fuel line of a vehicle as described for the device 20. The safety device 40 is preferably formed from two mating members 41 and 42 formed, as by casting, of any suitable material such as iron, steel, aluminum and the like.

Referring to Figures 5 and 6, it will be observed that the cast members 41 and 42 are provided with identical but opposite hand, substantially semi-circular cavities which form fuel passageways and chambers when the cast members 41 and 42 are secured together and these cavities will bear the same reference characters with the cavities in the cast member 41 bearing the prime notation.

Referring to Figure 5, it will be observed that the member 42 is substantially triangular in shape and has a semi-circular cavity or passageway 43 therein communicating with a threaded cavity 45 and the semi-circular passageway extends at an angle from the bore 45 and communicates with a semi-circular cavity 46 which extends at an angle thereto and perpendicular to the cavity 45 and communicates with a semi-circular cavity 47 extending at an angle thereto which communicates with a semi-circular cavity 48 which preferably extends in a vertical plane when the device 40 is secured in the fuel line of a vehicle.

A plurality of enlarged chambers 50 are provided in the portions 43, 47 and 48, the chambers 50 being substantially semi-circular and communicating at each end with the respective cavities 43, 47 and 28 and serving to form one-half of a chamber adapted to receive a hollow weight member 51 similar to the weight members 30 in the first form of the invention, the chamber 50 mating with a similar chamber in the cast portion 41 to form a chamber of similar construction to the chamber 25 in the device 20.

Each of the chambers 50 is restricted to form an orifice 52, and the weight member 51 is provided with a pointed tip 53 which is adapted to seat in the restricted orifice 52 when the safety device 40 is moved from normal position, in a manner like that previously described for the device 20.

The member 41 is adapted to be secured to the member 42 by any suitable means such as bolts 55 and a gasket 56 is disposed between the members 41 and 42 to provide an effective seal. The member 41 is provided with a semi-circular cavity 43 which is adapted to mate with the cavity 43 in the member 42 and the cavity 43' extends at an angle and then reversely back as at 46' and then again reversely back as at 47' and then vertically as at 48' and the cavities 43', 47' and 48' are provided with enlarged chambers 50', the chambers 50' as well as the cavities 43', 47' and 48' being adapted to coincide with the chambers 50, the cavities 43, 46, 47 and 48 to form a cylindrical tube or fuel line within the members 41 and 42 when the members are secured together as may be observed in Figure 4. Each of the chambers 50 and 50' is provided with a suitable seat 54, 54' upon which the weight members 51 are adapted to seat when the device 40 is in normal position.

The weight members 51 may be of the same construction as the weight members 30 shown in Figures 2 and 3 or may be of any suitable construction to permit fluid to flow therethrough or therearound in normal operation and also being so constructed as to slide, by gravity, within the chambers 50, 50' upon upsetting of the device to cause the tip portion 53 thereof to shut off the orifice 52, 52' and to shut off flow of fuel flowing through the device. A suitable coupling 57 is secured in the threaded bore 45, 45' and this coupling 57 is secured to a coupling 58 connected to the fuel line 14 to thus permit fuel to flow through the safety device 40 in a manner similar to the manner heretofore described for the structure shown in Figures 1 and 2.

It will be observed that the member 42 is slightly different from the member 41 in that a fuel outlet is provided as at 60 at the uppermost portion of the chamber 50, 50' in the cavities 48, 48', the outlet extending at right angles to the chamber 50, 50' and being provided with a suitable coupling 61 connected to a coupling 62 connected to the fuel line 15 leading through the carburetor 16 to the engine 19.

*Third form*

Referring now to Figures 8, 9, 10 and 11, there will be observed still another form of this invention adapted to be connected in a fuel line such as the fuel line 14, 15 shown in Figure 1 and to operate upon the same principle as the original form of the invention, the structure being slightly different.

This form of the invention is broadly designated at 70 and is formed from a pair of members 71 and 72 formed from any suitable material such as metal, as by casting and which are suitably secured together as by bolts 73 and have a gasket 75 disposed therebetween. The members 71 and 72 are provided with cavities therein preferably semi-circular in shape and which are identical but opposite hand and coincide with each other when the members 71 and 72 are secured together as illustrated in Figure 8 and these mating cavities form bores or passageways in the device 70 and for purposes of illustration the cavities will bear the same reference characters with the cavities in the member 71 bearing the prime notation. It will thus be observed that one-half of a threaded bore 76 is provided in the bottom of the member 70 adapted to receive a coupling 77 connected to a coupling 78 secured to a fuel pipe such as the fuel pipe 14. A cavity 80 extends at an angle from the threaded bore 76 and is restricted as at 81 and communicates with another enlarged cavity 82 which is restricted as at 83, the cavities 82 and 83 extending at an angle to the cavities 80 and 81 and the upper end of the cavity 83 (Figure 9) communicates with an enlarged cavity 85 having a restricted portion 86 communicating with a threaded cavity 87 adapted to receive a coupling 88 connected to a coupling 89 for securing the same to a fuel pipe such as a fuel pipe 15 leading to a carbureter.

The member 72 has mating cavities 76', 80', 81', 82', 83', 85', 86', and 87' identical to the cavities in the member 71 and the cavities provide a passageway through the device 70. It will thus be seen that fuel may flow through the pipe 14 through said passageways and out through the couplings 88 and 89 and through the pipe 15 to the carbureter 16.

Now, hollow weight members 100 are provided which may be of similar construction to the weight members 30 and 51 but which in this form of this invention are preferably of a slightly different construction and have a cylindrical portion 101 and a tapered portion 102. The cylindrical portion 101 of the weight member 100 has a bore 103 extending partially thereinto and a plurality of smaller bores 105 penetrate the cylindrical surface of the portion 101 and communicate with the bore 103.

The chambers 80, 82 and 85 are each provided with a weight member 100 and the weight members 100 normally are disposed in the chambers 80, 82 and 85 with the tapered portions 102 thereof partially penetrating the respective restricted passageways 81, 83 and 86 so that fuel flowing through the device will flow through the bores 103 and 105 and around the members 100. Now when the vehicle with which the device 70 is associated is upset or overturned, the angular disposition of the chambers 80, 82 and 85 cause one or more of the weight members 100 to slide, by gravity, so that the tapered portion 102 jams in the restricted passageway 81, 83 or 86 and prevents fuel from flowing therethrough.

The members 71 and 72 are shown as being irregular in shape to conform to the angularity of the passageways therethrough but if desired, the members 71 and 72 may be of any desired shape.

*Fourth form*

Referring to Figure 12, there is shown still another modified form of this invention in which a single member 110 is provided formed from any suitable material as by casting, and preferably being of an irregular shape with a portion 111 extending at an angle to the fuel line and a portion 112 extending back in acute angular relation to the portion 111 and having a portion 113 extending vertically in line with the fuel line. The member 110 has a bore 120 therein which is sealed by a plug 121 and the other end of the bore 120 communicates with a restricted bore 122 which communicates with one end of a bore 123, the bores 122 and 123 extending to the left-hand side of the member 110 and being closed by a suitable plug 125. The bore 123 extends in the portion 112 in angular relation to the bores 120 and 122 and communicates with a restricted bore 126 which communicates at its other end with a bore 127 communicating with the exterior of the portion 113 and closed by a plug 128, the bore 127 communicating at its other end with a restricted bore 130 communicating with a threaded bore 131 adapted to receive a coupling 132 for connecting the same to a suitable coupling 133 connected to a pipe such as a pipe 15 extending to the carbureter.

The portion 111 also has a threaded bore 135 therein communicating with the bore 120 and the threaded bore 135 has the lower portion thereof threaded for reception of a coupling 136 adapted to be connected to a coupling 137 connected to a pipe such as the fuel line 14 to thus permit fuel to flow through the pipe 14, the bores 135, 120, 122, 123, 126, and 130 and out the upper end of the member 110 into pipe 15 through the couplings 132 and 133. The plugs 121, 125 and 128 are provided to seal the respective bores 120, 123 and 127 after they are drilled in the member 110 and also provided to permit access to the interior of the device.

Suitable weight members 105 of identical or similar construction to the weight members 103 are disposed within the bores 120, 123 and 127 respectively, and normally seat at the base of the bores and are adapted to be slidably moved by gravity so that the tapered portion thereof will jam in the bores 122, 126 and 130 upon the device 110 being moved out of its normal position to thus cut off the flow of fuel therethrough in a manner identical to that in which the fuel is cut off in the forms of the invention previously described.

It should be noted that in all forms of this invention when the vehicle is upset or overturned and the weight member has its end seated in the restricted orifice to cut off the flow of fuel, fuel pressure on the weight member will act to hold it in position to provide an effective seal until the vehicle is again placed in an upright position.

In the drawings and specification there has been set forth a prefered embodiment of the invention and although specific terms are employed, they are used in a generic and descriptive sense only and not for purposes of limitation, the scope of the invention being defined in the claims.

I claim:

1. In a vehicle having an engine, a fuel supply and a line leading from said fuel supply to said engine, means disposed within the line adapted to cut off the supply of fuel to said engine upon said vehicle being upset or overturned, comprising a plurality of enlarged chambers disposed in series within said fuel line and communicating with the fuel line and disposed at angles to each other, each of said chambers having a seat at one end thereof, and a tapering orifice at the other end thereof, a hollow member slidably mounted within each of said chambers and having a tapered imperforate end and adapted to normally rest on said seat, said hollow members having openings therein to permit fuel to flow therethrough and thereabout, whereby upon said vehicle being upset or overturned, at least one of the hollow members disposed within said chambers will move by gravity so that the tapered end thereof will jam in the orifice in said chamber to prevent the flow of fuel therethrough.

2. In a vehicle having an engine and a fuel reservoir, and a fuel line leading from said fuel reservoir to said engine, and said line having at least a portion thereof extending vertically, a safety device disposed in the vertically extending portion of said fuel line and comprising a plurality of chambers disposed in series in said fuel line and extending in off-set relation to each other, said chambers each having a base intake portion and a restricted outlet portion, a weight member slidably mounted within each of said chambers and normally resting on said base portion, said weight members being so constructed as to permit fuel to by-pass the same when the weight members are resting on the bases of said chambers and said weight members each being provided with an imperforate tip, whereby upon said vehicle being upset or overturned at least one of the weight members will slide by gravity within its chamber so that the tip portion thereof will seat in the restricted portion of said chamber to prevent the flow of fuel therethrough.

3. In a vehicle having an engine, a fuel supply and a line leading from said fuel supply to said engine, means disposed with the line adapted to cut off the supply of fuel to said engine upon said vehicle being upset or overturned, comprising a plurality of enlarged chambers within said fuel line and disposed in series in said fuel line and also disposed in angular relation to each other, said chambers communicating at each end with the fuel line and each having a seat at one end thereof and a tapering orifice at the other end thereof, a member slidably disposed within each of said chambers and adapted to normally rest on said seat, said member having an imperforate end whereby upon said vehicle being upset or overturned, the member disposed within at least one of said chambers will be caused to move by gravity so that the imperforate end thereof will jam in the orifice in said chamber to prevent the flow of fuel therethrough, said chambers being disposed in angular relation to each other to insure operation of the member in at least one of said chambers upon the vehicle being upset in any direction.

4. In a vehicle having an engine and a fuel reservoir, and a fuel line leading from said fuel reservoir to said engine, and said line having at least a portion thereof extending vertically, a safety device disposed in the vertically extending portion of said fuel line and comprising a plurality of chambers communicating at each end with said fuel line and extending in angular relation to each other, said chambers being disposed in series in said fuel line, said chambers each having a base intake portion at one end joined to the fuel line and a restricted outlet portion at its other end adjacent the fuel line, a weight member slidably mounted within each of said chambers and normally resting on said base portion, each of said weight members being so constructed as to permit fuel to by-pass the same when the weight members are positioned on the base portions of said chambers and each of said weight members being provided with an imperforate tip, whereby upon said vehicle being upset or overturned the weight member in at least one of said chambers will slide by gravity within said chamber so that the imperforate tip will jam the restricted portion of said chamber to prevent the flow of fuel therethrough and said chambers being disposed in angular relation to each other to insure operation of at least one weight member upon the vehicle being upset in any direction.

5. In a vehicle having an engine, a fuel supply and a line leading from said fuel supply to said engine, a safety device disposed within said line comprising a member having a passageway therethrough, said member being connected at each end to said fuel line to permit fuel to flow through the passageway therein, said member being provided with a plurality of enlarged chambers in said passageways, said enlarged chambers being disposed at an angle to each other and so positioned that fuel flowing through said member will flow successively through each of said enlarged chambers, each of said enlarged chambers having a restricted portion, a weight member normally positioned within each of said enlarged chambers to permit fuel to flow therethrough, and said weight members being slidable within said enlarged chambers upon said vehicle being upset or overturned to cause at least one of the weight members so slide by gravity into the restricted portion of the enlarged chamber to cut off the flow of fuel through said chamber.

6. In a vehicle having an engine, a fuel supply and a line leading from said fuel supply to said engine, means for automatically cutting off the flow of fuel through said line upon said vehicle being upset or overturned comprising said line having a first portion thereof extending at an angle to the vertical and communicating with a second portion extending in a horizontal plane, said second portion communicating with a third portion extending at an angle thereto, said third portion communicating with a fourth portion of the line extending vertically, and said first and third angularly disposed portions and said fourth vertically disposed portion each being provided with an enlarged chamber so that fuel flowing successively through said portions will successively flow through said chambers, each of said chambers having a restricted orifice therein through which the fuel normally flows, each of said chambers being provided with a slidable perforate weight member normally disposed out of engagement with said orifice and having an imperforate end adapted to seat in said orifice upon the vehicle being upset or overturned so that at least one of said perforate weight members will act to cut off the flow of fuel through the line upon the vehicle being overturned or upset in any direction.

7. In a vehicle having an engine, a fuel supply, and a line leading from said fuel supply to said engine, a safety device disposed within the fuel line comprising a pair of mating members, each of said members having a plurality of substantially semi-circular cavities therein, said cavities being adapted to coincide and form passageways when the mating members are secured together, means for securing the mating members together, means for connecting the fuel line to each end of said members in communication with said passageways so that fuel will flow through said device, said passageways being provided with a succession of enlarged chambers therein each having a restricted orifice, said chambers being disposed in angular relation to each other and to the vertical, and each of said chambers having a weight member slidably mounted therein, each of said weight members being so constructed as to permit fuel to flow thereabout in normal operation, and each of said weight members having a tip portion, whereby upon said vehicle being upset or overturned one or more of said weight members will move by gravity so that the tip portion thereof will seat in the restricted orifice to cut off the flow of fuel through the device.

8. In a vehicle having an engine, a fuel supply and a fuel line from said fuel supply to said engine, a safety device disposed in said fuel line, said safety device comprising a pair of mating members, a gasket, means for securing said mating members together with the gasket therebetween, each of said members having coinciding communicating cavities therein forming a passageway through said device, means for securing the fuel line to said device in communication with each end of said passageway to cause fuel to flow through said device, and said device having a plurality of chambers therein disposed in said passageway, a weight member slidably disposed in each of said chambers, some of said chambers being disposed at an angle to the vertical so that said weight members will normally be positioned in the lower portion of the chambers and will not restrict the flow of fuel through the chambers and whereby, upon said vehicle being overturned or upset, at least one of said weight members will be caused to slide by gravity to the other end of its chamber and partially into said passageway to cut off the flow of fuel through said chamber and said passageway.

9. In a vehicle having an engine, a fuel supply and a fuel line from said fuel supply to said engine, a safety device disposed in said fuel line, said safety device comprising a pair of mating members, a gasket, means for securing said mating members together with the gasket therebetween, each of said members having coinciding communicating cavities therein forming a passageway through said device, means for securing the fuel line to said device in communication with each end of said passageway to cause fuel to flow through said device, and said device having a plurality of chambers therein disposed in series in said passageway, a weight member slidably disposed in each of said chambers, some of said chambers being disposed at an angle to the vertical so that said weight members will normally be positioned in the lower portion of the chambers and will not restrict the flow of fuel through the chambers and whereby, upon said vehicle being overturned or upset, at least one of said weight members will be caused to slide by gravity to the other end of its chamber and partially into said passageway to cut off the flow of fuel through said chamber and said passageway, the angle of disposition of said chambers being great enough to prevent the weight member therein from sliding during normal operation of the vehicle and small enough to insure sliding movement of the weight member when the vehicle is upset or overturned.

10. In a vehicle having an engine, a fuel reservoir and a line leading from said fuel reservoir to said engine, a safety device disposed within and communicating with said line comprising a pair of irregularly shaped members, a gasket disposed between said members, means for securing said members together, each of said members having a plurality of cavities therein, the cavities in one of said members mating with the cavities in the other of said members to form a passageway through said device when the members are secured together, means for connecting the fuel line to each end of said device in communication with said passageways to cause fuel to flow through said device, and said passageways having portions extending at an angle to the vertical and at an angle to each other and each of said angularly disposed portions being provided with an enlarged portion and a restricted portion, a weight member normally disposed within each of said enlarged portions and having a tapered end whereby upon said vehicle being upset or overturned, one or more of said weight members will slide by gravity so that the tapered end thereof will seat in the respective restricted portion of the passageway to cut off the flow of fuel therethrough.

11. In a vehicle having an engine, a fuel reservoir and a line leading from said fuel reservoir to said engine, a safety device disposed within and communicating with said line comprising a pair of irregularly shaped members, a gasket disposed between said members, means for securing said members together, each of said members having a plurality of cavities therein, the cavities in one of said members mating with the cavities in the other of said members to form a passageway through said device when the members are secured together, means for connecting the fuel line to each end of said device in communication with said passageways to cause fuel to flow through said device, and said passageways having portions extending at an angle to the vertical and at an angle to each other and each of said anguarly disposed portions being provided with an enlarged portion and a restricted portion, a weight member normally disposed within each of said enlarged portions, each of said weight members having a cylindrical body and a tapered end, said cylindrical body having a longitudinally extending bore therein and at least one transverse bore communicating with said longitudinally extending bore to normally permit fuel to pass through said weight member, whereby upon said vehicle being upset or overturned, one or more of said weight members will slide by gravity so that the tapered end thereof will seat in the respective restricted portion of the passageway to cut off the flow of fuel therethrough.

12. In a vehicle having an engine, a fuel supply and a line leading from said fuel supply to said engine, a safety device for cutting off the supply of fuel to said engine upon said vehicle being upset or overturned comprising an irregularly-shaped member having at least three portions, a first portion extending at an angle to the vertical and a second portion extending at an angle to said first portion and a third portion extending vertically from said second portion, said first portion having a bore therein and extending therethrough and restricted at the end thereof adjacent said second portion, said second portion having a bore therein extending therethrough and restricted at the end thereof adjacent said third portion and said third portion having a bore therein extending therethrough and restricted at the outer end thereof, a plurality of plugs for closing one end of each of said bores, all of said bores communicating with each other and forming a passageway through the irregularly shaped member, and means for connecting a fuel line to each end of said member to permit fuel to flow therethrough, each of said enlarged bores being provided with a hollow perforate weight member slidably disposed therein and having an imperforate end portion, said weight member being so disposed as to normally permit fuel to flow therethrough and thereabout and whereby, upon said vehicle being upset or overturned, at least one of the weight members will move by gravity so that the imperforate end portion thereof will jam in the restricted bore to prevent the flow of fuel through the safety device.

13. In a vehicle having an engine, a fuel supply and a line leading from said fuel supply to said engine, a safety device for cutting off the supply of fuel to said engine upon said vehicle being upset or overturned comprising an irregularly-shaped member having at least three portions, a first portion extending at an angle to the vertical and a second portion extending at an angle to said first portion and a third portion extending vertically from said second portion, said first portion having a bore therein and extending therethrough and restricted at the end thereof adjacent said second portion, said second portion having a bore therein extending therethrough and restricted at the end thereof adjacent said third portion and said third portion having a bore therein extending therethrough and restricted at the outer end thereof, a plurality of plugs for closing one end of each of said bores, all of said bores communicating with each other in series and forming a passageway through the irregularly shaped member, and means for connecting a fuel line to each end of said member to permit fuel to flow therethrough, each of said enlarged bores being provided with a hollow perforate weight member slidably disposed therein and having an imperforate end portion, said weight members being so disposed as to normally permit fuel to flow therethrough and thereabout whereby, upon said vehicle being upset or overturned, the weight members will move by gravity so that the imperforate end portion thereof will jam in the restricted bore to prevent the flow of fuel through the safety device, and the angle of disposition of said bores being great enough to prevent the weight member from sliding during normal operation of the vehicle and small enough to insure sliding movement of the weight member when the vehicle is upset or overturned.

14. In a vehicle having an engine, a fuel supply and a line leading from said fuel supply to said engine, a safety device for cutting off the flow of fuel through line line upon said vehicle being upset or overturned comprising a member having a bore therein and extending therethrough, the opposed ends of said bore being threaded, coupling means secured in the opposed ends of said bore for connecting the fuel line to each end of said member to cause fuel to flow through the bore in said member, said bore having a plurality of angularly disposed chambers provided with a restricted portion communicating therewith, a weight member disposed within each of said chambers, each of said weight members being adapted to seat within the restricted portion of said chambers, and said weight members normally being so disposed within said chambers as to permit fuel to flow therethrough and being movable by gravity to seat within the restricted portion of said chamber upon the vehicle being overturned or upset to prevent the flow of fuel through said bore, said chambers being disposed in series in said passageway so the fuel will flow successively through said chambers.

15. In a vehicle having an engine, a fuel supply and a line leading from said fuel supply to said engine, a safety device for cutting off the flow of fuel through said line upon the vehicle being upset or overturned comprising a member positioned in said line, said member having a plurality of bores therein, said bores communicating with each other to form a passageway through said member, the fuel line being connected to at least two of said bores and means for closing the other of said bores to the atmosphere to permit fuel to flow through said passageway, said passageway having a plurality of chambers therein, said chambers being disposed at an angle to each other, each of said chambers having a restricted orifice connecting the same with said passageway, a weight member slidably positioned in each of said chambers, each of said weight members normally resting out of engagement with said restricted orifices to permit free flow of fuel through said passageways and said weight members being slidable into said restricted orifices to cut-off the flow of fuel through said passageways, whereby upon said vehicle being upset or overturned, at least one of said weight members will move by gravity to seat in the restricted orifice in its chamber to cut-off the flow of fluid through said passageway, said chambers being disposed in series in said passageway so the fuel will flow successively through said chambers.

DORUS P. RUDISILL.

REFERENCES CITED

The following references are of record in the file of this patent:

UNITED STATES PATENTS

| Number | Name | Date |
|---|---|---|
| 2,185,097 | Woodbridge | Dec. 26, 1939 |
| 2,258,328 | Gray | Oct. 7, 1941 |
| 2,391,852 | Winton | Dec. 25, 1945 |

FOREIGN PATENTS

| Number | Country | Date |
|---|---|---|
| 112,740 | Australia | Mar. 27, 1941 |